United States Patent
Russell

[11] 3,743,376
[45] July 3, 1973

[54] HOLOGRAPHIC BEAM COUPLER

[75] Inventor: John Patrick Russell, Thalwil, Switzerland

[73] Assignee: RCA Corporation, New York, N.Y.

[22] Filed: Aug. 25, 1971

[21] Appl. No.: 174,982

Related U.S. Application Data

[63] Continuation of Ser. No. 13,569, Feb. 24, 1970, abandoned.

[30] Foreign Application Priority Data
Mar. 26, 1969  Great Britain.................. 15,956/69

[52] U.S. Cl. ............................. 350/3.5, 350/162 R
[51] Int. Cl. ........................................... G02b 27/00
[58] Field of Search ...................... 350/3.5, 162 SF, 350/168, 174, 162 R; 178/5.4 BDP

[56] References Cited
UNITED STATES PATENTS
755,983  3/1904  Wood........................... 350/162 SF
3,506,327  4/1970  Leith et al. ........................ 350/3.5

FOREIGN PATENTS OR APPLICATIONS
1,106,220  3/1968  Great Britain...................... 350/3.5
1,139,121  1/1969  Great Britain...................... 350/3.5

OTHER PUBLICATIONS
Kock, 54 Proceedings of the IEEE 1610–1612 (11/1966) [350–3.5].

Sincerbox, 10 IBM Tech. Disc. Bulletin 267–268 (8/1967) [350–162ZP].

*Primary Examiner*—David Schonberg
*Assistant Examiner*—Ronald J. Stern
*Attorney*—Edward J. Norton, Glenn H. Bruestle and Irwin M. Krittman

[57] ABSTRACT

A plurality of separate angularly-disposed beams of wave energy, such as light, can be combined into a single composite beam of wave energy by simultaneously illuminating a holographic beam coupler with the plurality of angularly-disposed beams. The holographic beam coupler is prepared by recording each of a plurality of interference pattern components on a recording medium to form a resultant composite interference pattern on the medium. Each interference pattern component results from illuminating the recording medium with a different pair of angularly disposed beams of coherent wave energy, with the orientation and angle of incidence of one of the beams (the reference beam) of each of the plurality of pairs with respect to the medium being the same as each other and the orientation and angle of incidence of the other of the beams of each of the plurality of pairs with respect to the medium being different from each other and from that of the reference beam of each of the pairs.

10 Claims, 4 Drawing Figures

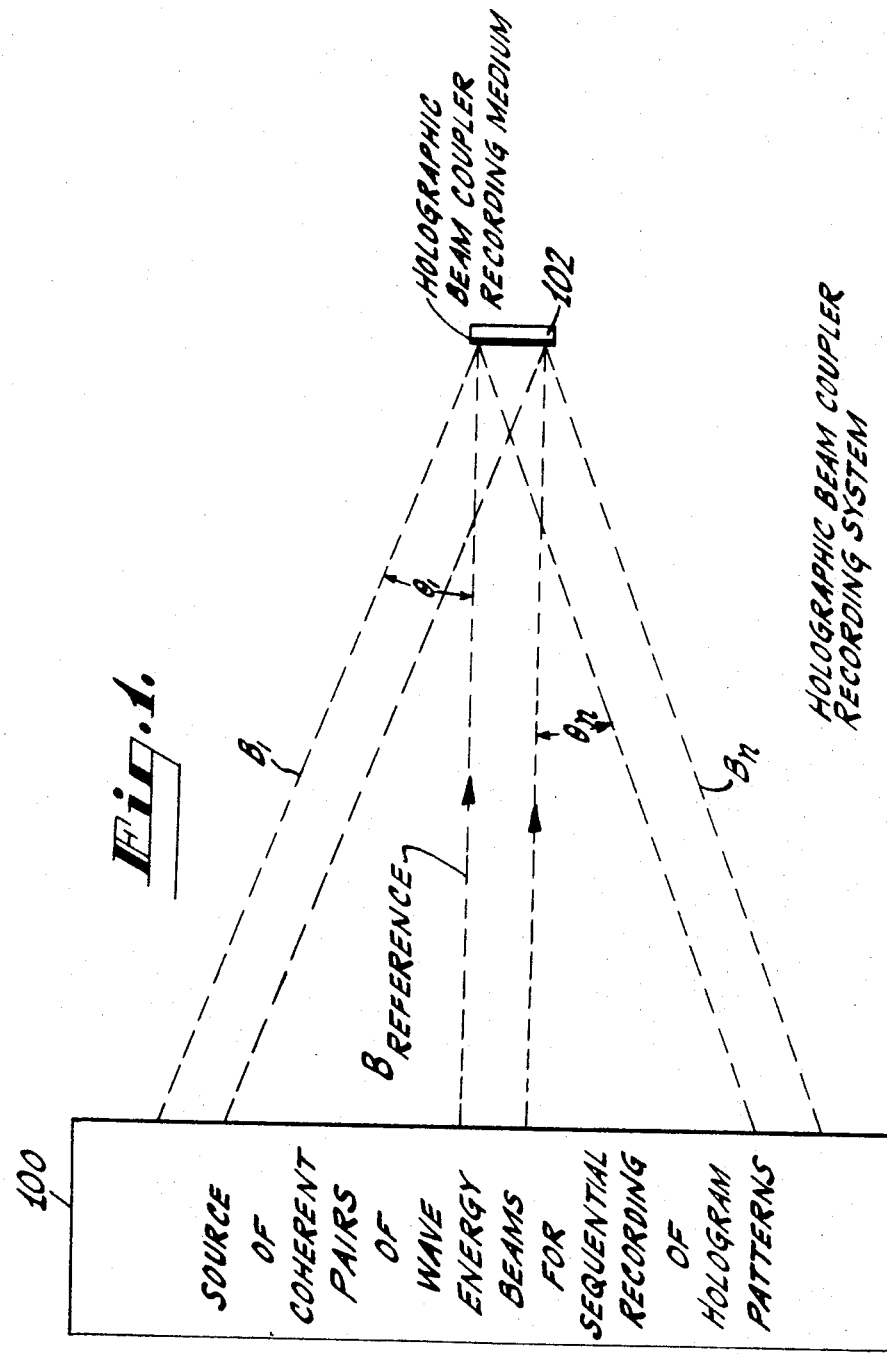

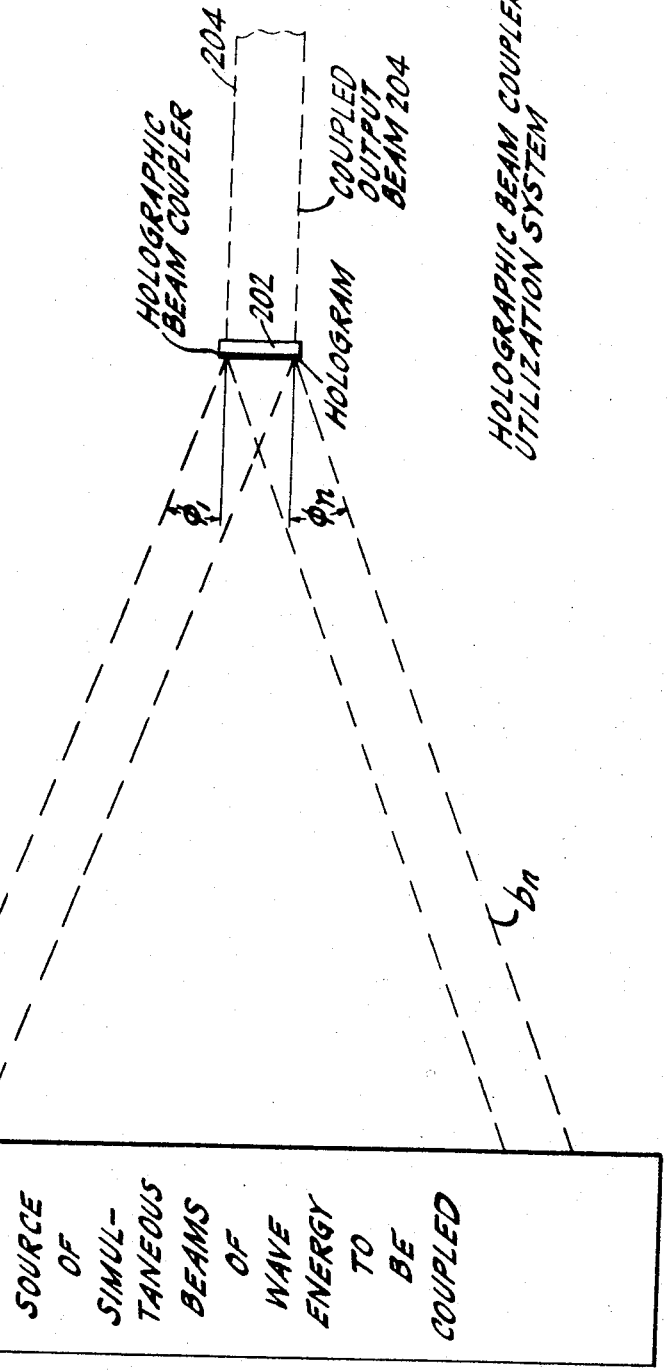

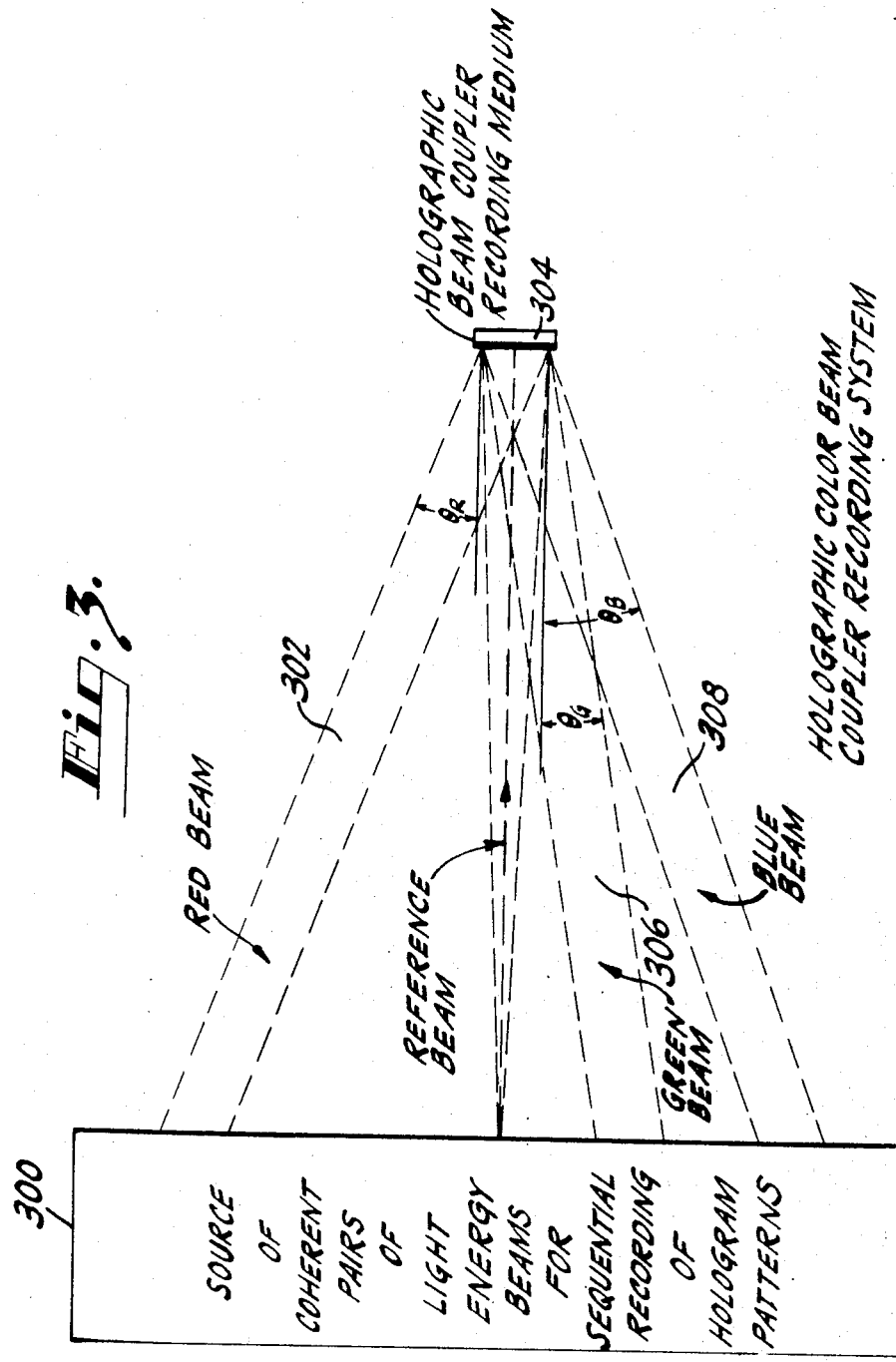

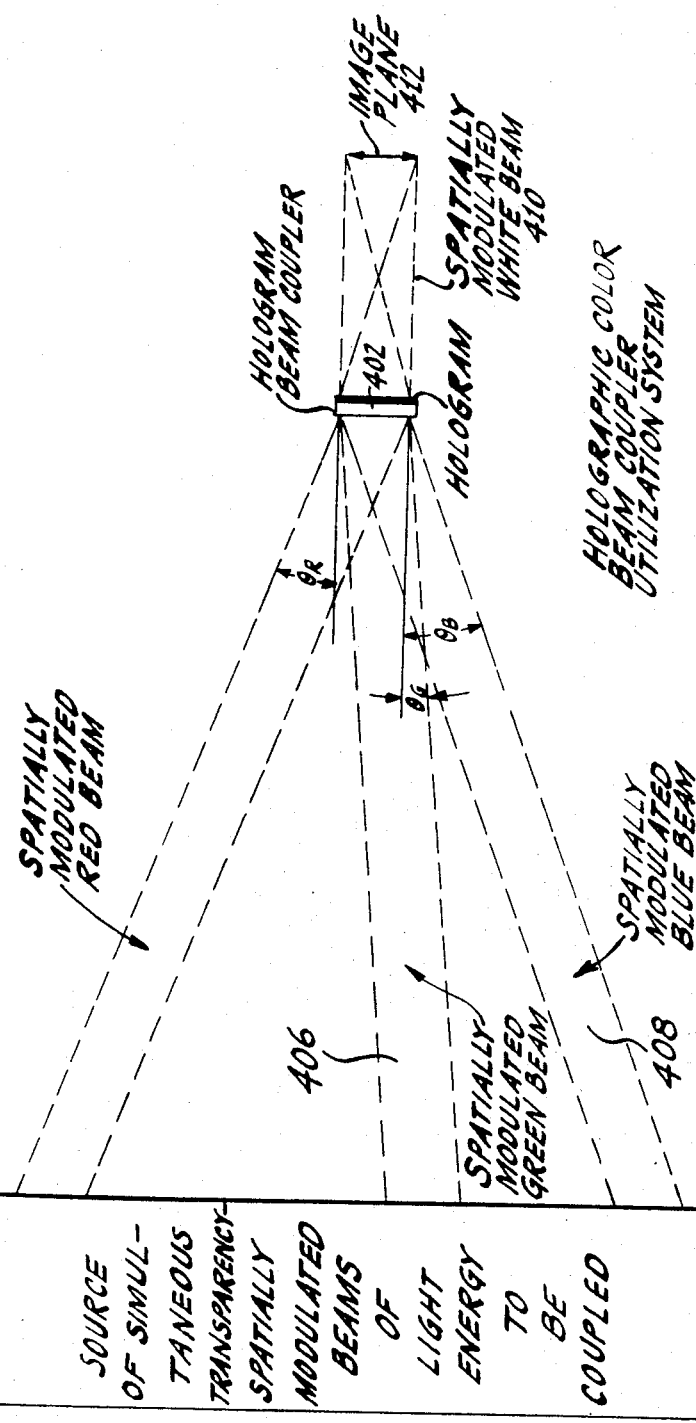

3,743,376

HOLOGRAPHIC BEAM COUPLER

This is a continuation of my co-pending application, Ser. No. 13,569, filed Feb. 24, 1970, and now abandoned.

This invention relates to a technique for combining a plurality of separate beams of wave energy into a single composite beam of wave energy and, more particularly, a holographic technique for doing so.

The term "wave energy", as used herein, includes electro magnetic waves of all wavelengths, acoustic waves, and any other type of waves which are capable of forming interference patterns. However, for illustrative purposes, the invention will be described in connection with light wave energy. The term "light," as used herein, includes electro-magnetic energy in the infra-red, visible and ultraviolet spectrum.

There are many cases when it is desirable to separately process each of a plurality of different beams of wave energy and then combine the plurality of beams into a single composite beam of wave energy. One such case, for example, is a phase-modulated light communication system, where it is desirable to combine a reference beam of light of a given wavelength with another beam of light of this wave-length whose phase with respect to that of the reference beam is varied in time in accordance with a modulating signal. In this case, the two combined beams of light may be transmitted as a single composite beam, so that any variation in phase due to the transmission path between the transmitting point and the receiving point will affect those beam components of the composite beam equally and, therefore, will not produce any distortion in the signals received at the receiving point. Another case, for example, is where one or more of the plurality of component beams of wave energy is a light beam which has been spatially modulated in intensity by passing it through a transparency before being combined with the others into a single composite beam. In this latter case, different ones of the plurality of light beam components may have different wavelengths from each other, and, for instance, manifest different primary colors which are mixed in the single resultant composite beam.

It is, therefore, an object of the present invention to provide a holographic technique for combining a plurality of separate beams of wave energy into a single resultant composite beam of wave energy.

Briefly, this is accomplished by means of a coupler comprising a medium at which is recorded a composite interference pattern comprising a first interference pattern component resulting from the interference between a first pair of coherent beams of wave energy and a second interference pattern component resulting from the interference between a second pair of coherent beams of wave energy. The orientation and angle of incidence of one beam of the first pair with respect to the medium is substantially identical to the orientation and angle of incidence with respect to the medium of one beam of the second pair. On the other hand, the orientation and angle of incidence with respect to the medium of the other beam of the first pair is significantly different from the orientation and angle of incidence with respect to the medium of the other beam of the second pair and from that of the aforesaid one of the beams of the first and second pairs.

This and other objects, features and advantages of the present invention will become more apparent from the following detailed description taken together with the accompanying drawing, in which:

FIG. 1 is a block diagram of one embodiment of a holographic beam coupler recording system;

FIG. 2 is a block diagram of a holographic beam coupler utilization system for employing a holographic beam coupler recorded in accordance with FIG. 1;

FIG. 3 is a block diagram of an embodiment of a holographic color beam coupler recording system, and FIG. 4 is a block diagram of a holographic color beam coupler utilization system employing the coupler of FIG. 3.

Referring now to FIG. 1, source 100 is a source of coherent pairs of wave energy beams for sequential recording of hologram patterns. In particular, source 100, which may include one or more lasers along with conventional beam-splitting optics, is capable of first producing a first pair of coherent beams of light energy at a first given wave-length, one of said beams of said first pair corresponding in direction with beam $B_{reference}$ and the other beam of said first pair corresponding in direction with beam $B_1$ in FIG. 1. As shown in FIG. 1, the orientation of beam $B_{reference}$ is normal to medium 102 and the orientation of beam $B_1$ is at an angle $\theta$ above beam $B_{reference}$. In general, beam $B_{reference}$ may have any given angle of incidence with respect to recording medium 102 and beam $B_1$ may have any other angle of incidence with respect to recording medium 102 which is significantly different from the given angle of beam $B_{reference}$.

The illumination of recording medium 102 by the first pair of coherent beams of wave energy results in a first interference pattern component being recorded on medium 102. The characteristics of this first interference pattern component will be determined by the wavelength of the first pair of coherent beams of wave energy and by the respective angles of incidence of each of the two beams of the first pair of coherent beams with respect to recording medium 102.

After the first interference pattern component has been recorded on recording medium 102, one or more additional interference pattern components are recorded in sequence in superimposed relationship with respect to each other and the first interference pattern component on recording medium 102 to provide a single composite interference pattern. More particularly, as shown in FIG. 1, after producing the first coherent pair of beams of wave energy at the first given wavelength discussed above, source 100 produces in sequence one or more other pairs of coherent beams of wave energy, such as a pair of coherent beams of wave energy at a second given wavelength composed of one beam having the direction $B_{reference}$ and another beam having the direction $B_n$. In particular, as shown in FIG. 1, the orientation of beam $B_{reference}$ of the other pair of coherent beams of wave energy is normal to recording medium 102 and the orientation of beam $B_n$ is at an angle $\theta_n$ below beam $B_{reference}$. In general, the angle of incidence with respect to recording medium 102 of one of the beams of each of the sequentially recorded pairs of coherent beams of wave energy (beam $B_{reference}$) are the same as each other, while the angle of incidence with respect to recording medium 102 of the other of the beams (beams $B_1 \ldots B_n$) of the sequentially recorded pairs of coherent beams of wave energy are significantly different from each other and from that of the aforesaid one beam of the respective pairs. Furthermore, the respective wavelengths of each of the sequential recorded pairs of coherent beams of wave energy can be the same as each other or they can be different from each other.

In any case, holographic beam coupler recording medium 102 finally has recorded thereon a composite interference pattern composed of a plurality of superimposed interference pattern components, each of which components results from the recording of each separate pair of coherent beams of wave energy. This composite interference pattern constitutes a hologram. The recorded hologram may be either a so-called surface or thin film hologram, in which case all of the different interference pattern components lie substantially in the same plane, or, in the alternative, it may be a so-called volume or thick film hologram, in which case the depth of the plane in which each interference pattern component is recorded is a function of the particular angle $\theta_1$ .... $\theta_n$ corresponding to that particular interference pattern component. A thick film recording medium is preferred because it minimizes the unwanted second-order effect of any cross modulation among the various recorded interference pattern components making up the composite interference pattern.

Although in FIG. 1, beams $B_1$ .... $B_n$ and $B_{reference}$ are all shown as parallel beams of plane waves, this is not essential. Depending upon the desired end use, discussed more fully below, one or more of these beams could be convergent or divergent beams of spherical waves. Furthermore in the special case where the wavelength of all the pairs of beams is the same, a single coherent source may be employed to derive all the beams and all the pairs may be recorded simultaneously, rather than sequentially.

Referring now to FIG. 2, there is shown a holographic beam coupler utilization system employing a holographic beam coupler which has been recorded in the manner described in connection with FIG. 1. Source of simultaneous beams of wave energy to be coupled 200, which may include one or more monochromatic light sources, such as lasers, along with conventional optical elements, simultaneously produces a plurality of angularly spaced readout beams $b_1$ .... $b_n$ which correspond respectively with beams $B_1$ .... $B_n$ of FIG. 1. These beams are directed to the hologram recorded on holographic beam coupler 202 which has been recorded in accordance with the holographic beam coupler recording system described above in connection with FIG. 1. In particular, readout beam $b_1$ is oriented at an angle $\phi_1$ above the normal to holographic beam coupler 202 and readout beam $b_n$ is oriented at an angle $\phi_n$ below the normal to holographic beam coupler 202.

The wavelength of each of readout beams $b_1$ .... $b_n$ may be either the same as each other or different from each other. Also, the wavelenth of each of readout beams $b_1$ .... $b_n$ may be the same as the wavelength of the particular one of beams $B_1$ .... $B_n$ of FIG. 1 with which it corresponds or it may be different therefrom. However, in all cases the ratio of the wavelength of any one of readout $b_1$ .... $b_n$ to the wavelength of that one of beams $B_1$ .... $B_N$ of FIG. 1 with which it corresponds is made substantially equal to the ratio of the sine, $\phi$, of the angle of that readout beam with respect to the normal to coupler 202 to the sine, $\theta$, of the angle of the one of beams $B_1$ .... $B_n$ of FIG. 1 with which it corresponds with respect to the normal to recording medium 102. Thus, the ratio of the wavelengths of readout beam $b_1$ to the wavelength of beam $B_1$ is made substantially equal to the ratio of sin $\phi_1$ to sin $\theta_1$. Similarly, the ratio of the wavelength of readout beam $b_n$ to the wavelength of $B_n$ is made substantially equal to the ratio of sin $\phi_n$ to sin $\theta_n$. Therefore, in the special case where the wavelength of readout beam $b_1$ is equal to the wavelength of the corresponding recording beam $B_1$, $\phi_1$ of FIG. 2 will equal $\theta_1$ of FIG. 1.

Source of simultaneous beams of wave energy to be coupled 200 may include means for modulating one or more of the beams to be coupled with intelligence. For instance, readout beams $b_1$ and $b_n$ may be derived from a single coherent source, so that they have the same wavelength, and source of simultaneous beams of wave energy to be coupled 200 may include a phase modulator, such as an electro-optic modulator, for phase modulating in time the phase of one of readout beams $b_1$ and $b_n$ with respect to the other in accordance with an intelligence signal. Instead of phase modulation, one or more of readout beams $b_1$ .... $b_n$ may be amplitude and/or frequency modulated in accordance with an intelligence signal. Another desirable form of modulation is spatial modulation of one or more of the beams. In the latter case, the intensity of wave energy varies from point to point over the cross section of a spatially modulated beam in accordance with an intelligence signal. This may be accomplished by including within source 200 a transparency through which a spatially modulated beam is passed.

In operation, addressing the hologram of holographic beam coupler 202 with readout beam $b_1$, having the wavelength and angular orientation discussed above, will result in the derivation of a first order diffraction component, which forms part of coupled output beam 204, emerging therefrom and oriented in a direction normal to coupler 202. Similarly, addressing the hologram of holographic beam coupler 202 with readout beam $b_n$ having the wavelength and angular orientation discussed above, results in the derivation of a first order diffraction component, forming part of coupled output beam 204, emerging therefrom and having an orientation normal to coupler 202. Thus, simultaneous illumination of coupler 202 by the plurality of readout beams $b_1$ .... $b_n$ results in the derivation of a plurality of first order diffraction components thereof emerging from coupler 202 which coincide to form a single composite coupled output beam 204. The reason for this is that all of the sequentially recorded pairs of coherent beams utilized in recording holographic beam coupler 202 employed respective reference beams having the same direction as each other with respect thereto. The angle of emergence of coupled output beam 204 with respect to holographic beam coupler 202 is determined by the angle of incidence of the respective reference beam $B_{reference}$ in FIG. 1 of the plurality of pairs of coherent beams employed in recording the hologram of holographic beam coupler 202.

FIG. 3 shows the application of the present invention to a holographic color beam coupler recording system. In FIG. 3, source of coherent pairs of light energy beams for sequential recording of hologram patterns 300 includes one or more lasers and conventional optic elements for first producing a first coherent pair of beams at a wavelength in the red spectrum composed of parallel beam 302 which is directed to holograph beam coupler recording medium 304 at an angle $\theta_R$ above the normal thereto and a divergent reference beam symetrically disposed with respect to the normal to recording medium 304. This results in the recording of a first interference pattern component on holographic beam coupler recording medium 304. After the first interference pattern component is recorded, recording medium 304 is illuminated by a second pair of coherent beams having a wavelength in the green spectrum. The second pair of coherent beams is composed of parallel beam 306 which is oriented at an angle $\theta_G$ below the normal to medium 304 and a divergent reference beam which coincides in orientation with the reference beam of the red first pair of coherent beams. This results in the recording of a superimposed second interference pattern component on medium 304. In a similar manner, a third pair of coherent beams having a wavelength in the blue spectrum illuminates medium 304. The third pair of coherent beams is composed of parallel beam 308 oriented at an angle $\theta_B$ below the normal to recording medium 304 and a divergent reference beam which coincides in orientation with the reference beams of the first and second pairs of coherent beams. This results in the recording of a third interference pattern component which is superimposed upon the previously-recorded first and second interference pattern components. Together, the first, second and third interference pattern components form a single composite interference pattern, which is a hologram.

Referring to FIG. 4, a source of simultaneous spatially modulated beams of light energy to be coupled includes light sources of wavelengths in the red, green and blue spectrums substantially identical to those employed in recording holographic beam coupler 402. Further, source 400 includes a first transparency containing the red information in a scene, which is placed in the path of the beam of red light to effect the spatial modulation thereof and thereby derive spatially modulated red beam 404. Red beam 404 is a parallel beam oriented at the same angle $\theta_R$ above the holographic beam coupler as was red beam 302 utilized in recording the hologram thereon. Similarly, spatially modulated green beam 406, which is oriented at the same angle $\theta_G$ as green beam 306, is derived from a second transparency within source 400 which contains the green information in the scene. Beam 406 illuminates holographic beam coupler 402 while it is simultaneously being illuminated by red beam 404. Also, spatially modulated blue beam 408, which is derived from a third transparency within source 400 containing the blue information in the scene, is directed to coupler 402 at an angular orientation $\theta_B$ equal to that of blue beam 308. Blue beam 408 illuminates coupler 402 simultaneously with red beam 404 and green beam 406.

It is to be noted that in FIG. 4 holographic beam coupler 402 is illuminated from the back, i.e., the recorded hologram is on the right side of holographic beam coupler 402, while illuminating beams 404, 406 and 408 arrive from the left side of FIG. 4. The effect of this is to reconstruct single convergent spatially modulated white beam 410, which contains all chrominesce and luminesce information of the scene contained in the three separate transparencies of source 400. The direction of travel and degree of convergence of beam 410 is determined by the direction and divergence of the reference beam employed in recording the hologram on holographic beam coupler 402. Convergent beam 410 will inherently reconstruct a real image of the scene defined by the three transparencies in full color in image plane 412. (If the hologram of coupler 402 had been illuminated from the front, rather than from the back as is the case in FIG. 4, the coupled beam would be a divergent beam and a virtual, rather than a real, image would be reconstructed).

Although the holographic beam couplers disclosed herein comprise transmission-type holograms, it is obvious that the holographic beam coupler disclosed herein could employ reflection-type holograms instead, since the equivalency of transmission and reflection type holograms is well known in the art.

I claim:

1. A method for combining a plurality of separate beams of wave energy into a single resultant composite beam of wave energy, said method comprising the steps of producing a first beam of wave energy at a first wavelength and directing said first beam of wave energy to a medium on which is recorded a given holographic interference pattern at a first predetermined angle of incidence with respect to said medium, simultaneously producing a second beam of wave energy at a second wavelength and directing said second beam of wave energy to said medium at a second predetermined angle of incidence with respect to said medium which is different from said first predetermined angle, at least one of said first and second beams varying in intensity from point to point over its cross-section in accordance with spatially-distributed information, and said given holographic interference pattern being responsive to the incidence of said first beam for deriving a first diffraction component emerging therefrom at a given angle of emergence with respect to said medium and being responsive to the incidence of said second beam for deriving a second diffraction component emerging therefrom at said given angle of emergence and in coincidence with said first diffraction component.

2. A method for employing three separate black and white transparencies, manifesting respectively the red, green and blue component information in a scene, to derive a single beam of light containing both the chrominance and luminance information in said scene, said method comprising the steps of simultaneously producing separate red, green and blue beams of light, spatially modulating each of said red, green and blue beams, respectively, by passing it through that one of said transparencies manifesting the color corresponding thereto, directing said spatially-modulated red beam to a medium on which is recorded a given holographic interference pattern at a first predetermined angle of incidence with respect to said medium, simultaneously directing said spatially-modulated green beam to said medium at a second predetermined angle of incidence with respect to said medium which is different from said first predetermined angle, simultaneously directing said spatially-modulated blue beam to said medium at a third angle of incidence with respect to said medium which is different from both said first and second predetermined angles, said given holographic interference pattern being responsive to the incidence of said red beam for deriving a first diffraction component emerging from said medium at a given angle of emergence with respect to said medium and being responsive to the incidence of said green and blue beams, respectively, for deriving second and third diffraction components, respectively, emerging from said medium at said given angle of emergence and in coincidence with said first diffraction component and with each other.

3. The method defined in claim 2, wherein said first, second and third diffraction components all converge to reconstruct in the same image plane a single real image of the confined information contained in said first, second and third transparencies.

4. A method for making a holographic beam coupler comprising the steps of illuminating a wave energy recording medium with a first pair of angularly disposed coherent beams of wave energy of a first given wavelength to record a first interference pattern component and illuminating the same recording medium with a second pair of angularly disposed coherent beams of wave energy of a second given wavelength to record a superimposed second interference pattern component which with said first component forms a composite recorded interference pattern, wherein the orientation and angle of incidence with respect to said medium of one of the beams of each of said respective first and second pairs is substantially identical to each other, and wherein the orientation and angle of incidence with respect to said medium of the other of said beams of each of said respective first and second pairs is significantly different from each other and from that of said one of said beams of said first and second pairs, and wherein said one of the beams of both said first and second pairs is spatially unmodulated.

5. The method defined in claim 4, wherein said first and second given wavelengths are equal to each other.

6. The method defined in claim 4, wherein said first and second given wavelengths are different from each other.

7. The method defined in claim 4, wherein said medium is photosensitive and said first and second pairs of beams are light beams.

8. The method defined in claim 4, wherein said first and second pairs illuminate said medium sequentially.

9. Apparatus for employing three separate black and white transparencies, manifesting respectively the red, green and blue component information in a scene, to derive a single beam of light containing both the chrominance and luminance information in said scene, said apparatus comprising a medium on which is recorded a given holographic interference pattern, and illuminating means for simultaneously producing separate red, green and blue beams of light, spatially modulating each of said red, green and blue beams, respectively, by passing it through that one of said transparencies manifesting the color corresponding thereto, directing said spatially modulated red beam to said medium at a first predetermined angle of incidence with respect to said medium, while simultaneously directing said spatially modulated green beam to said medium at a second predetermined angle of incidence with respect to said medium which is different from said first predetermined angle, and while simultaneously directing said spatially modulated blue beam to said medium at a third angle of incidence with respect to said medium which is different from both said first and second predetermined angles, said given holographic interference pattern being responsive to the incidence of said red beam for deriving a first diffraction component emerging from said medium at a given angle of emergence with respect to said medium and being responsive to the incidence of said green and blue beams, respectively, for deriving second and third diffraction components, respectively, emerging from said medium at said given angle of emergence and in coincidence with said first diffraction component and with each other.

10. Apparatus for making a holographic beam coupler comprising a wave energy recording medium, and means for illuminating said wave energy recording medium with a first pair of angularly disposed coherent beams of wave energy of a first given wavelength to record a first interference pattern component and illuminating the same recording medium with a second pair of angularly disposed coherent beams of wave energy of a second given wavelength to record a superimposed second interference pattern component which with said first component forms a composite recorded interference pattern, wherein the orientation and angle of incidence with respect to said medium of one of the beams of each of said respective first and second pairs is substantially identical to each other, and wherein the orientation and angle of incidence with respect to said medium of the other of said beams of each of said respective first and second pairs is significantly different from each other and from that of said one of said beams of said first and second pairs, wherein said one of the beams of both said first and second pairs is spatially unmodulated.

* * * * *